(12) United States Patent
Ocondi

(10) Patent No.: US 7,446,673 B2
(45) Date of Patent: Nov. 4, 2008

(54) INTELLIGENT WIRELESS MULTICAST NETWORK

(75) Inventor: Mark Ocondi, Aurora, CO (US)

(73) Assignee: CH2M Hill, Inc., Englewood, CO (US)

( * ) Notice: Subject to any disclaimer, the term of this patent is extended or adjusted under 35 U.S.C. 154(b) by 192 days.

(21) Appl. No.: 10/536,676

(22) PCT Filed: Oct. 30, 2003

(86) PCT No.: PCT/US03/34812

§ 371 (c)(1),
(2), (4) Date: May 27, 2005

(87) PCT Pub. No.: WO2004/040828

PCT Pub. Date: May 13, 2004

(65) Prior Publication Data

US 2007/0018851 A1    Jan. 25, 2007

Related U.S. Application Data

(60) Provisional application No. 60/422,759, filed on Oct. 30, 2002.

(51) Int. Cl.
*G08B 23/00* (2006.01)
(52) U.S. Cl. .................... 340/870.03; 340/870.02; 702/188; 370/351

(58) Field of Classification Search ............ 340/870.02, 340/870.03; 702/138, 188; 455/422.1; 370/351
See application file for complete search history.

(56) References Cited

U.S. PATENT DOCUMENTS

| 4,811,308 | A | | 3/1989 | Michel | |
|---|---|---|---|---|---|
| 5,239,575 | A | * | 8/1993 | White et al. | 379/106.06 |
| 5,682,422 | A | * | 10/1997 | Oliver | 379/106.03 |
| 5,874,903 | A | * | 2/1999 | Shuey et al. | 340/870.02 |
| 5,941,305 | A | * | 8/1999 | Thrasher et al. | 166/53 |
| 6,216,956 | B1 | | 4/2001 | Ehlers et al. | |
| 6,747,571 | B2 | * | 6/2004 | Fierro et al. | 340/870.02 |
| 6,826,405 | B2 | * | 11/2004 | Doviak et al. | 455/445 |
| 6,980,929 | B2 | * | 12/2005 | Aronstam et al. | 702/188 |
| 2003/0001754 | A1 | * | 1/2003 | Johnson et al. | 340/870.02 |
| 2003/0037602 | A1 | | 2/2003 | Glasgow, Jr. et al. | |
| 2003/0083013 | A1 | | 5/2003 | Mowery et al. | |
| 2003/0162538 | A1 | | 8/2003 | Yoo et al. | |
| 2003/0174070 | A1 | * | 9/2003 | Garrod et al. | 340/870.07 |
| 2003/0208579 | A1 | | 11/2003 | Brady, Jr. et al. | |
| 2004/0098218 | A1 | * | 5/2004 | Ito et al. | 702/138 |
| 2004/0156352 | A1 | * | 8/2004 | Freeman et al. | 370/351 |

* cited by examiner

*Primary Examiner*—Albert K Wong
(74) *Attorney, Agent, or Firm*—Dorsey & Whitney LLP

(57) ABSTRACT

Disclosed is a supervisory control and data acquisition (SCADA) system using a spread spectrum or licensed frequency data radio network and communication method therefore allowing multiple slave hosts and slave devices or remote terminal unit (RTU) the ability to communicate data connectivity in a wireless network environment.

15 Claims, 4 Drawing Sheets

REMOTE TERMINAL UNIT
TELEMETRY DRIVER FLOW CHART

HOST TELEMETRY DRIVER
FLOW CHART

INTELLIGENT WIRELESS MULTICAST NETWORK

CROSS-REFERENCE TO RELATED APPLICATIONS

This application claims priority under 35 U.S.C. 119(e) to U.S. provisional Patent Application 60/422,759, filed on Oct. 30, 2002 and is a national stage application of International Patent Application No. PCT/US2003/034812 filed on Oct. 30, 2003, which applications are incorporated by reference herein to the extent there is no inconsistency with the present disclosure.

BACKGROUND OF THE INVENTION

1. Field of the Invention

This invention relates to a unique communication system that allows multiple mobile and stationary computers to communicate information, and more specifically oil and gas field information with a remote supervisory control and data acquisition (SCADA) system in a wireless multicast network environment. More specifically it relates to an improved oil and gas field data communication methodology that affects improved oil and gas field operating efficiency.

2. Background of the Related Art

The majority of oil and gas fields cover a large geographic area and are often situated in remote and adverse terrain. Because of the communications protocol typically used and the limited historical memory of the SCADA system, the master computer system has to constantly scan the field. The constant scanning of remote SCADA units inherently ties up the radio system and disallows any other computer systems from scanning the SCADA units. The conventional (SCADA) supervisory control and data acquisition system uses the spread spectrum or licensed frequency data radio for a single host or for a single master system to scan the remote telemetry units (RTUs) or slave systems in the field to, for example, to retrieve measurement data from a remote telemetry unit and or to download a command from a master control unit to activate an element, i.e., to turn a valve off or on. For other computer systems to access field or RTU remote telemetry unit data, it must go through the master computer host outside of the radio network. This in turn requires a second computer networking system and software to allow another computer within the network to access the field or RTU's remote telemetry unit data. In the known prior art, U.S. Patent Publication 2003/0162538 appears to teach remote control units and a telemetry data reporting system that allows remote control from a remote communication center which sends out and receives transmissions. U.S. Pat. Nos. 5,941,305 and 6,041,856 appear to teach a real-time data acquisition system using remote control units that report data variables such as temperature, pressure, flow characteristics etc. via radio link. U.S. Pat. Nos. 4,721,158; 5,252,031; and, 5,819,849 appear to teach oil well pump control systems through monitoring by RTU's. U.S. Patents and Publications 2003/0174070; 200210198978; U.S. Pat. Nos. 3,803,362; 5,335,730; and, 5,010,333 appear to teach telemetry systems for remote monitoring of wells in which transmission links send well data to a remote monitoring system.

SUMMARY OF THE INVENTION

It is thus an object of the present invention to provide a machine method and system that is specifically designed to allow access to oil and gas field operating data and to control oil and gas field production from anywhere, using a communication system similar to a cell phone operating system.

It is another object of the present invention to allow an operator to control and operate a remote oil or gas well from anywhere in the field, as well as from any office or location using a conventional phone line.

The present invention satisfies these objects and specifically overcomes the disadvantages of the, prior art discussed above. Accordingly, the present invention is directed to a supervisory control and data acquisition (SCADA) system using an intelligent wireless multicast network (IWMN) communication system that allows multiple slave host computers asynchronous communications to the slave computers remote telemetry units (RTUs).

The object of the present invention is to allow multiple slave host computers access to any slave computer or remote telemetry units (RTU) on the same radio system as the master host computer. One advantage is to allow field personal the ability to scan any (RTU) remote telemetry units in the field from his/her slave computer or (RTU) remote telemetry unit, for example from a vehicle. Real time and historical data can be stored in slave computer or (RTU) remote telemetry units and retrieved and transmitted.

In order to achieve the above objective, every slave device either (RTU) remote telemetry units or slave host has to link to one master host in the radio network. When a message is transmitted from a slave device, the master host computer will receive and handle the message. During the handling process, the host computer will parse through the message and first determine if the message is intended for the master host computer. If the message is not intended for the master host computer, the message is then re-broadcast or re-transmitted out to all of the slave devices in the radio network. This echoing affect allows communication between slave devices in the radio network.

The machine method in accordance with the present invention includes at least a "remote component system" and a "host component system". The remote component system is located at a wellhead location, the wellhead location usually being remote from a central operations office at which the host component system is located. The remote component system includes an art known electronic computer data logger, such as an electronic chart recording system. The electronic data logger of the remote component system is connected to transducers at oil and gas wells in the field that measure and transmit line pressure, flow differential pressure, and temperature, all as analog data. In preferred embodiments, as taught for example in Ocondi U.S. Pat. No. 5,983,164, the remote component system is also connected to transducers that measure and transmit the oil and gas well data casing pressure and the pressure of the tubing immediately adjacent to the well head, also as analog data. Also, as taught for example in Ocondi U.S. Pat. No. 5,983,164, the remote component system electronic data logger includes software to trend the analog data accurately, and a memory system to store in a retrievable format, as a function of time, the analog data so collected. To maintain measurement integrity the memory system also stores and logs digital data of precise events, such as valve positions, to indicate the actual period of gas flow, all as a function of time. The remote component system also includes a system for transmitting both analog trending and event log digital data to the host component system, which is normally located at the central operations office, upon request. In preferred embodiments, the analog trending and event log digital data will be transmitted using art known data compression technique.

The third component of the system, as a part of the communication network scheme, using an art known notebook computer connected to a FreeWave radio. FreeWave radios are a non-licensed spread spectrum data radio. Currently, each FreeWave radio can transmit data up to 115,000 BPS "Bits Per Second" (2× of a 56K phone modem). The data is packetized and stamped with an address of the destination radio and a CRC value to provide transmission error detection. Since the radio uses a non-licensed radio frequency, there is a greater chance for emf interference. When the receiving radio receives the data, it determines if the message contains the address of the receiving radio. If the address matches the address of the receiving radio own, the data is then checked for validity with the CRC value. If the entire data stream is verified, the data is passed to a terminal device.

The FreeWave radio-to-radio data throughput is about 6 × of the data between the devices. This allows several messages from different scanning devices to communicate to the FreeWave radio at the same time. The Freewave radio has several built in functions that allow for data retries and linking. Every FreeWave radio can be programmed to act as a repeater, node repeater "RTU Repeater", network, slave and master radio.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DETAILED DESCRIPTION OF THE PREFERRED EMBODIMENT

As used herein, a Remote Terminal Unit (RTU) is a computer with software and hardware that records and controls remote electronic devices measuring and controlling oil and gas fields. Such devices include, for example, those used for reading pressure and flow volumes in oil and gas wells and fields. Others such electronic devices are used to open and close valves in oil and gas wells and fields. The RTUs also record device information which, in the practice of the present invention, are transmitted to other computers to use.

The RTU can also control external devices. The data stored in the RTU can be uploaded and downloaded from other computers known as host computers. Data transferred wirelessly is done through a radio network.

As used herein, a radio network is a system of data radio devices that are all connected wirelessly allowing data to be transferred between host computers and RTU computers. In such a radio network the radios are configured for different purposes. There are slave radios and repeater radios ion the network. The slave radios and repeater radios are all linked to at least one master radio. Every message transmitted by a slave radio is received by the master radio. The repeater radio is used to expand the range of the master radio. The repeater radio just hops any message received by the master and or slave radio. As used herein, a master host computer is a computer with software that has access "connectivity" to a data radio. The software in the master host computer will transfer data to and from any RTUs in the radio network through the data radio. There is normally only one master host computer in the radio network. All other computers in the radio network are known as slave devices or slave computers.

As used herein, a slave host computer is a computer with software that has access "connectivity" to a data radio. The software in the slave host computer will transfer data to and from one or more RTU in the radio network through the data radio. There can be multiple numbers of slave host computers.

Figure 1:
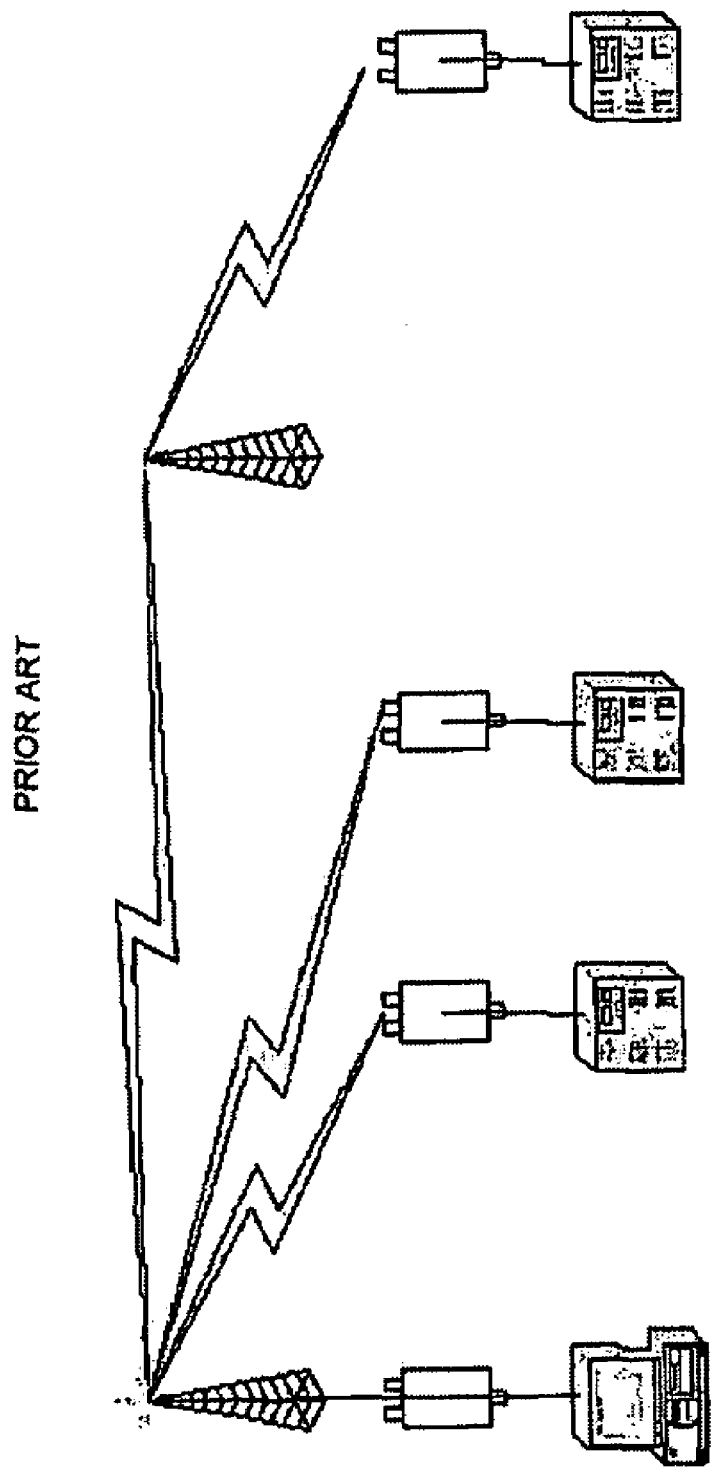
FIG. 1 is a view illustrating the construction of a conventional wireless SCADA system.
Figure 2:
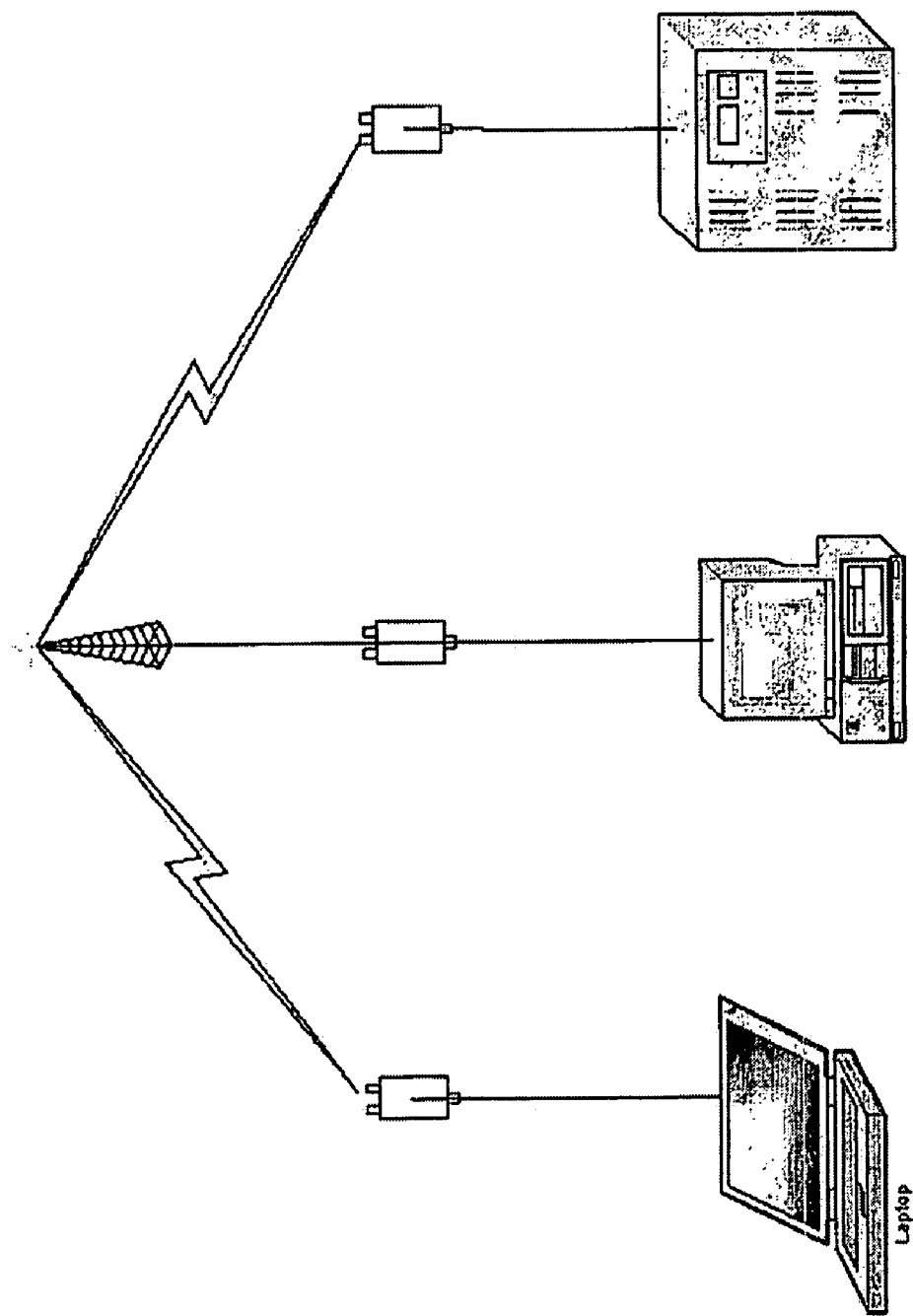
FIG. 2 is a block diagram of a single SCADA supervisory control and data acquisition system with one master host and one slave computer and one (RTU) remote telemetry unit, all wirelessly linked through a single tower according to the present invention.
Figure 3:
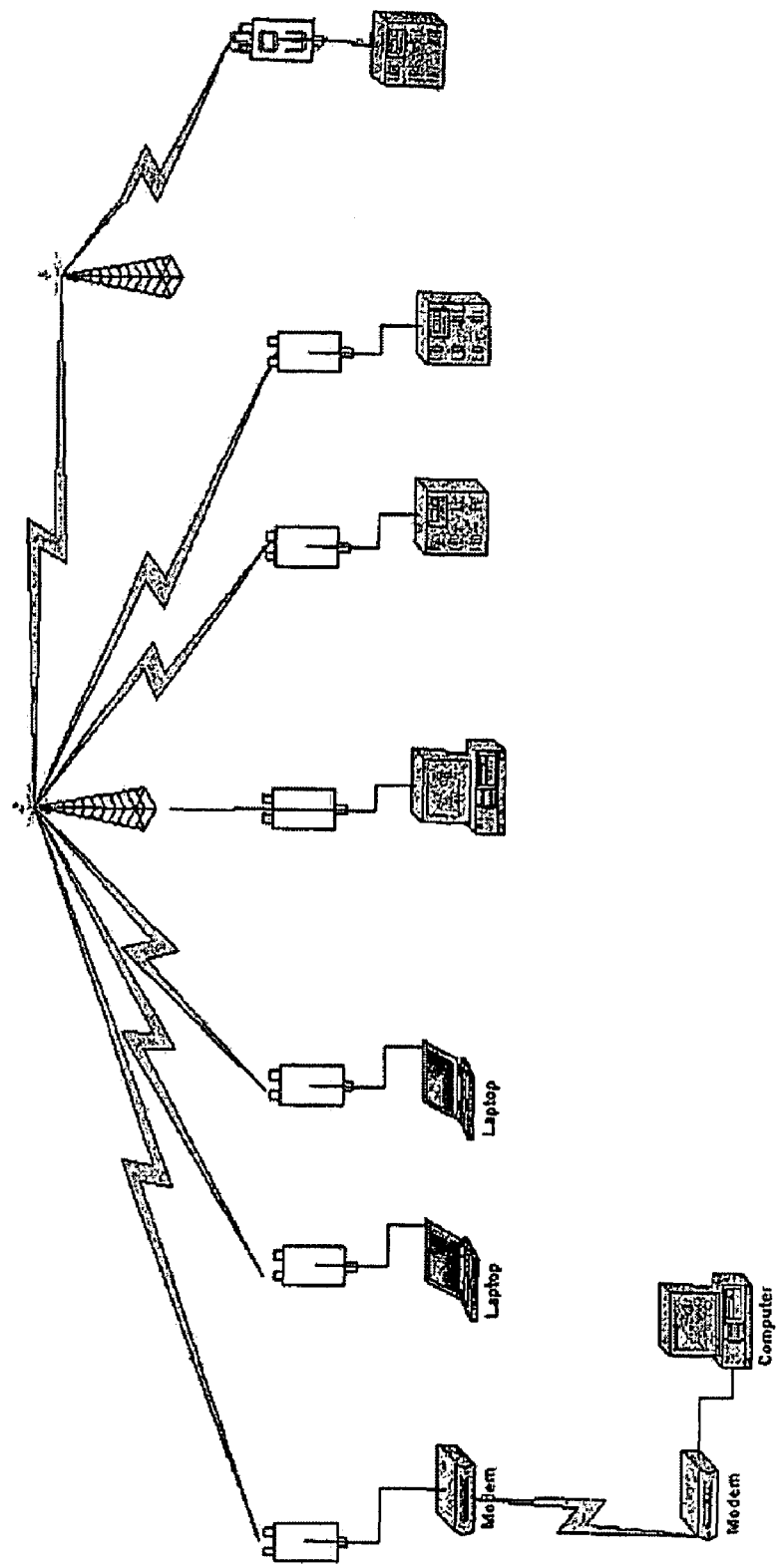
FIG. 3 is a block diagram of a SCADA supervisory control and data acquisition system with one master host and several slave computers RTUs, all wirelessly linked through a single tower according to the present invention.
Figure 4A:
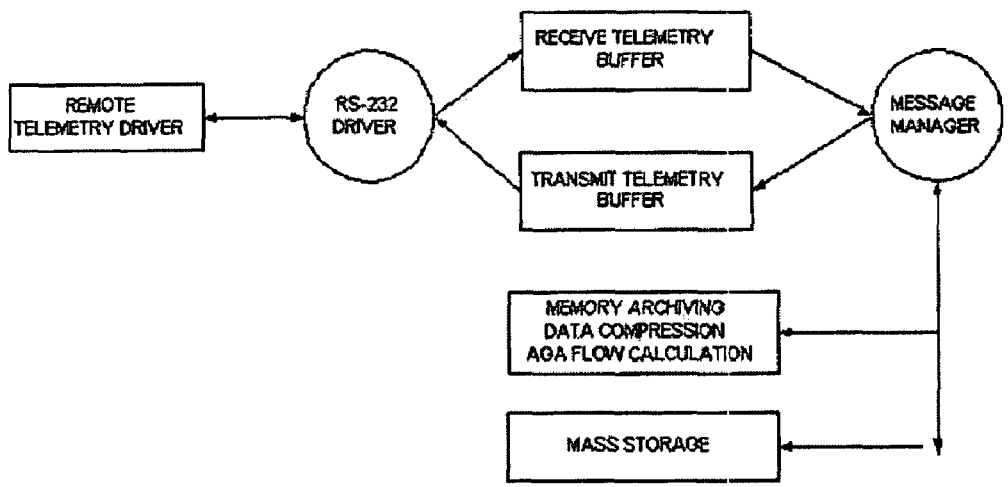
FIGS. 4a and 4b show flowcharts illustrating methods operating the SCADA supervisory control and data acquisition system with one master host and several slave computer RTUs according to the present invention as shown in FIGS. 2 and 3.
Figure 4B:
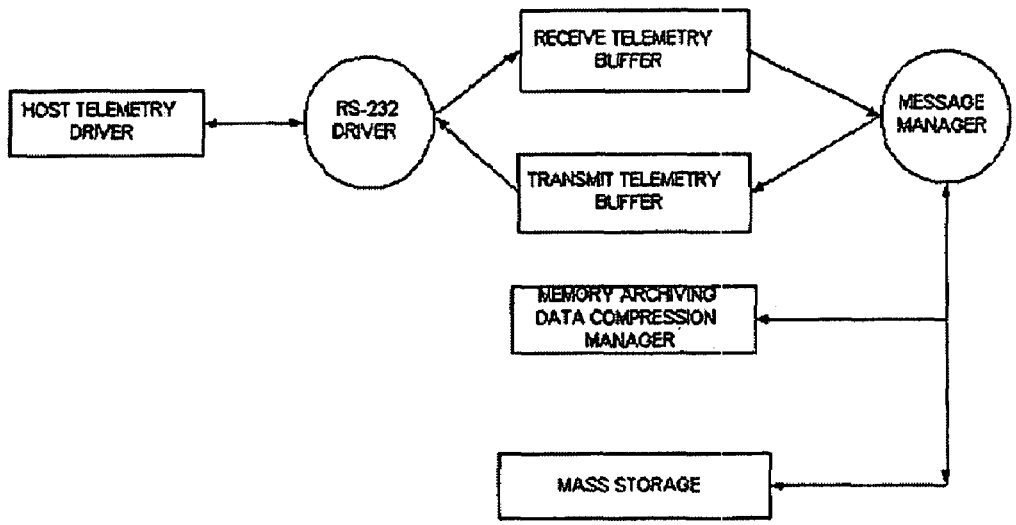

In the practice of the present invention, every computer will have an assigned address that makes it unique in the network. All data messages transmitted by any computer on the radio network, contain the address of the source computer and the destination computer. Referring to the chart of FIG. 3 and the flow charts of FIGS. 4a and 4b, the present invention provides master host message handling and echoing messages back on the radio network. Messages transmitted from the master host computer are received by every slave device in the radio network. Only one slave device having an address that matches the intended destination address will store and process the intended message. Messages originating from any and all slave hosts in the field will first be received by the master host. Each received message will carry the address of the originating slave host and the address of the destination computer. The master host will attempt to identify that destination address in order to identify the originating slave host for that message. If the master host can identify the originating slave host for that message it stores and process the information received. If the master host cannot identify the originating slave host pest for any particular message, that is if the message is not intended for the master host, then the master host rebroadcasts the message to all of the slave devices so that the intended slave device can receive, store and process the information received.

Software Directs and Manages the Data Flow Within the Network

Because of the power of the Freewave radios mentioned above, software has been provided, for example as shown in the 37 pages of comm.text, enclosed with the priority claimed U.S. provisional application, to focus on controlling and directing the flow of data to allow multiple computers or host systems including field notebook units. Each RTU and Host device uses CRC for error checking on every packet of data. Every data message includes a source and destination address. When any device master or slave sends a data message on the radio system, all devices on the radio network will receive the same message. The device with a matched destination address will respond.

Data managing software such as comm.text coupled with the addressing scheme provided by the internal software of the FreeWave radio, creates an intelligent data traffic manager that allow several host systems to communicate to any systems with in the network Since any radios within the network are capable of storing and forwarding operations, a virtual unbound communication system is created by the invented software system. Therefore, a remote computer host can reach any RTU site as long as it is within communication range with any other RTU site or a repeater site within the network The following maps will show how the above communication scheme can be accomplished using the invented software.

The present invention also utilizes software programs that operate in conjunction with the multicast spread-spectrum peer to multipeer radio system. The software installed at the master host computer acts as a data traffic director. Every message transmitted contains a source and destination address. All messages transmitted from SCADA units and mobile computer systems are received by the master host computer. The message received is decoded and interpreted. The destination address in the message is compared to the source address of the master host. If the message is not intended for the master host, it is encoded and retransmitted "echoed" to all SCADA and mobile units in the field. This methodology of interpreting and redirecting data is the source of the intelligent wireless multicast network To accomplish the traffic director task, the system is designed to operate in a distributive mode whereby the host system only communicates with the remote SCADA systems during off "office hours". Historical data is stored in nonvolatile memory for a selected period, say up to 35 days, at every SCADA unit. In conjunction with the protocol, data compression and high-speed throughput the master host can scan several days of historical data in a short period of time. This will allow the host to resume the traffic directing duty and free the airwave for the remote SCADA systems to initiate transmission of critical alarm messages.

A conventional phone line can be used in conjunction with a dialup modem and spread spectrum radio to allow computer systems off site to access SCADA systems in the field. The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A wireless data communication system, comprising:
   one or more slave devices, wherein at least one slave device comprises a remote telemetry unit (RTU);
   one or more slave host computers able to perform remote control of said RTU's and logging of measurement data as well as event logging of alarm messages of said RTU's;
   a master host computer for directing wireless data messages between the RTU's and the one or more slave host computers, performing remote control of said RTU's and archiving or logging of measurement data and event logging of alarm messages of said RTU's, wherein each wireless data message transmitted from said master host computer to said slave devices is transmitted to multiple slave devices;
   a data radio communication network connecting said master host computer and said one or more slave devices, wherein each slave device has a unique address in the network;
   a means for connecting said one or more slave host computers to said data radio communication network, wherein said wireless data messages contain a destination address corresponding to the unique network address of the slave device that the data message is intended for, wherein each slave device is able to compare its unique network address with the destination address contained in the wireless data message, and wherein the wireless data message is submitted to the master host computer prior to being sent to the multiple slave devices and the master host computer re-broadcasts the wireless data message to the multiple slave devices.

2. The wireless data communication system as claimed in claim 1 wherein said measurements comprise pressure and flow volume measurements of gas or oil wells.

3. The wireless data communication system as claimed in claim 1 wherein said remote control of the RTU's comprises incrementally opening and closing valves in gas or oil wells.

4. The wireless data communication system as claimed in claim 1 wherein said master host computer comprises a spread spectrum or licensed frequency data radio.

5. The wireless data communication system as claimed in claim 1 wherein said data radio communication network comprises:
   a) a spread spectrum or licensed frequency data radio;
   b) one or more slave radios connected to said RTU's and the slave host computers;
   c) a master radio connected to the master host computer able to send and receive transmissions from the one or more slave radios to allow connectivity between said master host computer and said slave radios; and
   d) one or more repeater radios.

6. The wireless data communication system as claimed in claim 1 wherein said one or more slave host computers comprise a spread spectrum or licensed frequency data radio.

7. A method of allowing multiple slave host computers to communicate on a wireless data communication system, said communication system comprising a master host computer for directing wireless data messages, one or more remote telemetry units (RTU's), a data radio communication network connecting said master host computer and said one or more RTU's, wherein each RTU has a unique address in the network; one or more slave host computers connected to the data radio communication network and able to perform remote control of said RTU's and data archiving or logging of measurement data and event logging of alarm messages of said RTU's; and one or more slave radios connected to said RTU's, said method comprising the steps of:
   a) linking a master host computer to the data radio communication network, wherein the master host computer directs data messages on the network between the RTU's and the one or more slave host computers;
   b) assigning to each data message a destination address corresponding to the master host computer, slave host computer, or RTU that the data message is intended for;
   c) receiving data messages at the master host computer from any slave host computer;

d) re-broadcasting data messages received by the master host computer intended for one or more of the RTU's to multiple slave radios;

e) transmitting data messages received by the slave radios from the master host computer to the RTU's; and f) comparing at each RTU the destination address of the data messages received from the one or more slave radios with the unique network address of the RTU;

wherein step c) is performed prior to step d).

8. The method of claim 7 further comprising the steps of:

a) transmitting a second data message from one of the RTU's to the master host computer through one or more of the slave radios, wherein the second data message has a second destination address;

b) determining if the second destination address corresponds to the master host computer; and c) transmitting the second data to multiple slave host computers when the second destination address does not correspond to the master host computer.

9. The method of claim 7 further comprising allowing one or more slave host computers to be installed in a mobile vehicle to allow an operator to access trending measurement data, event log of alarm messages and provide control of one or more RTU's from remote locations.

10. The wireless data communication system of claim 1, wherein the RTU or slave host computer that originates the wireless data message disregards the re-broadcast by the master host computer.

11. The wireless data communication system of claim 1, wherein the unique network address further comprises a source identifier corresponding to the RTU or slave host computer that originates the message and when an RTU or slave host computer responds to the wireless data message by swapping the source identifier contained within the wireless data message with its own source identifier.

12. The wireless data communication system of claim 1, wherein there is no direct link between the one or more slave host computers and the RTUs.

13. The method of claim 7, further comprising disregarding, by the slave host computer that originated the wireless data message, the re-broadcasted wireless data message.

14. The method of claim 7, wherein the unique network address further comprises a source identifier corresponding to the RTU or slave host computer that originates the message, and the when an RTU or slave host computer responds to the wireless data message, swapping the source identifier contained within the wireless data message with its own source identifier.

15. The method of claim 7, wherein there is no direct link between the one or more slave host computers and the RTUs.

* * * * *